March 27, 1956     R. L. KOOIKER     2,739,824

CORN SAVER SHIELD FOR FARM TRACTOR REAR WHEELS

Filed Dec. 1, 1952

INVENTOR.
Ralph L. Kooiker
BY
Sam J. Slotsky
ATTORNEY

United States Patent Office 2,739,824
Patented Mar. 27, 1956

2,739,824

CORN SAVER SHIELD FOR FARM TRACTOR REAR WHEELS

Ralph L. Kooiker, Hull, Iowa

Application December 1, 1952, Serial No. 323,431

3 Claims. (Cl. 280—160)

My invention relates to a corn saver shield.

My invention pertains to a shield for saving corn.

An object of my invention is to provide a shield which will fit adjacently to a tractor rear wheel and which will straighten bent, twisted or tangled stalks, so that they will then be positioned for directing the same into a picker.

A further object of my invention is to provide a shield which can be adjustably mounted with respect to different sizes of tractor frameworks.

A further object of my invention is to provide an arrangement whereby the shield can be elevated by the operator when turning and to provide a shield which will ride over uneven ground.

Figure 1:
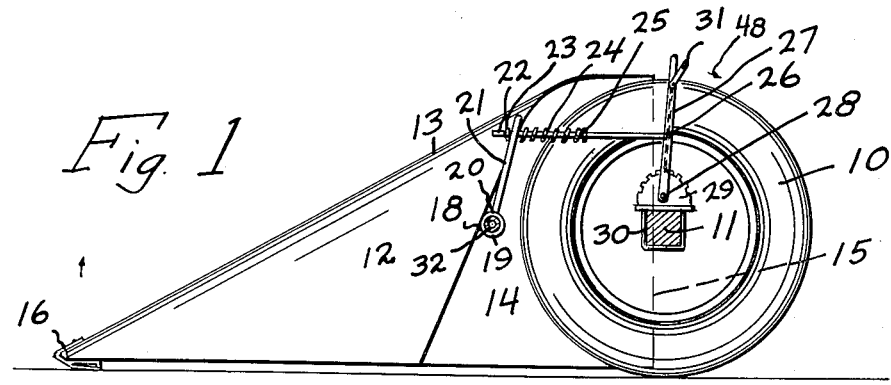
Figure 2:
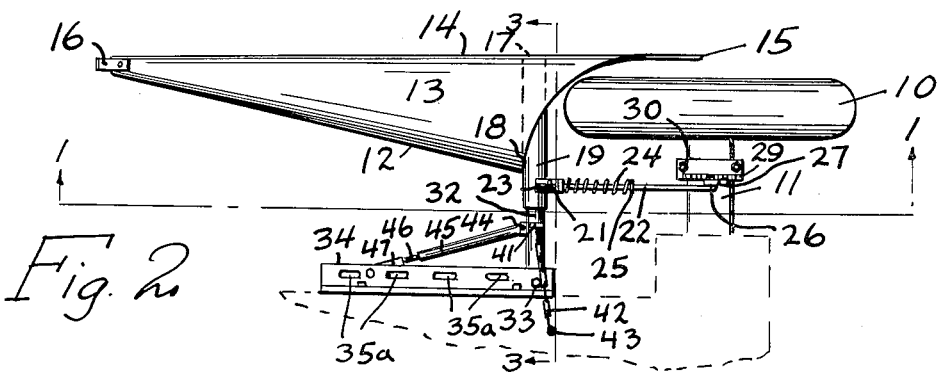
Figure 3:
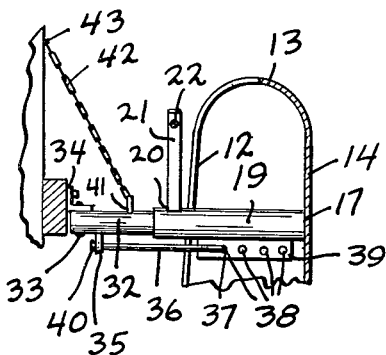

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a side view taken in section substantially along the lines 1—1 of Figure 2, Figure 2 is a plan view of the shield together with the supporting brackets and, Figure 3 is a sectional view of Figure 2 taken substantially along the lines 3—3 thereof.

My invention contemplates the provision of a shield structure which can be readily mounted to a tractor which includes a forwardly projecting nose or apron which will straighten out stalks which have been previously bent by pickers passing through the field so that a great deal of the corn which otherwise would be wasted will be salvaged.

I have used the character 10 to indicate one of the rear wheels of a tractor, the character 11 indicating the rear axle.

The shield itself comprises a sheet metal member having the inner wall 12 extending into the arcuate portion 13, and a further outer wall 14 which extends beyond the portion 12 as shown to the edge 15 thereby substantially covering the wheel 10, and affixed to the forward end of the shield is the skid member 16.

Welded or otherwise securely attached to the shield member at 17 and 18 is a pipe 19 to which is attached at 20 the upper extending lever 21 through which passes the rod 22 to which is attached the outer washer 23 and receiving the rod 22 is the compression spring 24 which bears against the further attached washer 25. The rod 22 is pivotally attached at 26 to the control lever 27 which is pivotally attached at 28 to the notched arcuate ratchet member 29 which is secured by means of the U bolt 30.

The lever 27 includes the hand control member 31 which operates a suitable pawl for engagement with any one of the notches in the member 29.

Received within the pipe 19 is a male pipe 32 which is secured at 33 to an angle member 34 which can be secured in any desired manner to the tractor framework, and attached to the tube 32 is an ear 35 in which is loosely engaged a rod 36 (see Figure 3), the end 37 of the rod 36 being received through any one of the openings 38 in the downwardly projecting flange 39 which is secured to the pipe 19, the rod 36 having the head 40.

Also attached to the pipe 32 is a further lug or ear 41 to which is attached the chain 42 which is secured at 43 to the tractor framework, and pivotally attached at 44 to an extending lug attached to the pipe 32 is a bracing member 45 which is threadably engaged with the threader studs 46, which stud in turn is threadably engaged with the lug 47 which is secured to the angle member 34.

The member 34 includes a series of spaced lengthened openings 35a.

It will now be noted that as the unit travels along the ground, the shield will pass through the stalks, straightening any bent or twisted stalks to an erect position, whence they will then be satisfactorily directed into a corn picker, thereby saving the corn which would otherwise be wasted.

By pulling on the lever 27 in the direction of the arrow 48, the forward end of the shield can be raised when it is desired to turn the tractor about or for other reasons, the pipe 19 rotating on the inner pipe 32. Also as the nose travels along, the shape of the skid 16 will allow the shield to travel along uneven ground, with the lever 21 and spring 24 providing a resilient action.

It will also be noted that the bracket and supporting arrangement permit the attachments of the device to a variety of tractor sizes or shapes, since the lateral position of the shield can be regulated by means of the rod 36 being placed in any one of the openings 38, the rod being loose enough for the pivotal action, however. The chain 42 also permits an adjustable support at substantially any desired point by attaching to any selected link to any point on the tractor.

The stud 46 can be rotated to adjust the member 45 to any selected position consistent with the attaching point on the tractor, and for changing the angle of the shield; also the openings 35a will permit attachments where desired.

It will thus be seen that the shield can be accommodated to a variety of tractor sizes, or can be accommodated to various tractor frameworks.

It will now be seen that I have provided the various advantages set forth in the objects of my invention with various other advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. In combination with a tractor, the rear wheel and the rear axle portions of said tractor, a corn saver shield comprising a tapered shield member adapted to travel ahead of said tractor rear wheel, said shield having a rear portion substantially covering said tractor wheel, means for securing said shield to the tractor including an outer female pipe attached to said shield, a stationary male pipe attached to the tractor framework engaged within said female pipe for providing means whereby said shield can be rocked in a vertical plane, a lever attached to said female pipe, a further control lever attached to the tractor axle portion including a rod pivotally attached to said further control lever, the other end of said rod engaging said lever, spring means interposed between said levers for imparting a resilient action to said shield member when traveling over uneven ground, means for adjustably spacing said shield laterally including a flange attached to said female pipe, said flange having a plurality of spaced openings, a rod attached to said male pipe having an end portion for engaging any of said openings.

2. In combination with a tractor, the rear wheel and the rear axle portions of said tractor, a corn saver shield comprising a tapered shield member adapted to travel ahead of said tractor rear wheel, said shield having a rear portion substantially covering said tractor wheel, means for securing said shield to the tractor including an outer female pipe attached to said shield, a stationary male pipe attached to the tractor framework engaged within said female pipe for providing means whereby said shield can be rocked in a vertical plane, a lever attached to said female pipe, a further control lever attached to the tractor axle portion including a rod pivotally attached to said further control lever, the other end of said rod engaging said lever, spring means interposed between said levers for imparting a resilient action to said shield member when traveling over uneven ground, means for adjustably spacing said shield laterally including a flange attached to said female pipe, said flange having a plurality of spaced openings, a rod attached to said male pipe having an end portion for engaging any of said openings, a side angle member for attachment to said tractor, said male pipe being attached to said angle member, said angle member including a plurality of openings for providing selected attachments to the tractor framework.

3. In combination with a tractor, the rear wheel and the rear axle portions of said tractor, a corn saver shield comprising a tapered shield member adapted to travel ahead of said tractor rear wheel, said shield having a rear portion substantially covering said tractor wheel, means for securing said shield to the tractor including an outer female pipe attached to said shield, a stationary male pipe attached to the tractor framework engaged within said female pipe for providing means whereby said shield can be rocked in a vertical plane, a lever attached to said female pipe, a further control lever attached to the tractor axle portion including a rod pivotally attached to said further control lever, the other end of said rod engaging said lever, spring means interposed between said levers for imparting a resilient action to said shield member when traveling over uneven ground, means for adjustably spacing said shield laterally including a flange attached to said female pipe, said flange having a plurality of spaced openings, a rod attached to said male pipe having an end portion for engaging any of said openings, a side angle member for attachment to said tractor, said male pipe being attached to said angle member, said angle member including a plurality of openings for providing selected attachments to the tractor framework, an adjustable chain member attached to said male pipe member, an adjustable bracing member secured to said male pipe member and said angle member for effecting desired angularities and positioning of said shield member.

References Cited in the file of this patent
UNITED STATES PATENTS

| | | |
|---|---|---|
| 1,619,670 | Haberman | Mar. 1, 1927 |
| 1,689,046 | Olson | Oct. 23, 1928 |
| 1,843,392 | Heide | Feb. 2, 1932 |
| 2,413,355 | Johnson | Dec. 31, 1946 |
| 2,690,342 | Willey | Sept. 28, 1954 |